United States Patent [19]  [11] 4,371,226
Brancaleone  [45] Feb. 1, 1983

[54] FILTER CONNECTOR AND METHOD OF ASSEMBLY THEREOF

[75] Inventor: Salvatore T. Brancaleone, Newport Beach, Calif.

[73] Assignee: International Telephone and Telegraph Corporation, New York, N.Y.

[21] Appl. No.: 198,295

[22] Filed: Oct. 20, 1980

[51] Int. Cl.³ .......................................... H01R 23/08
[52] U.S. Cl. ................................. 339/147 R; 29/854; 29/882; 333/183; 339/143 R
[58] Field of Search .............. 339/17 CF, 17 LM, 19, 339/143 R, 147 R, 147 P; 333/181–185; 29/837, 876, 881, 884, 874, 854, 882

[56] References Cited

U.S. PATENT DOCUMENTS

| 3,538,464 | 11/1970 | Walsh | 333/182 |
| 3,710,285 | 1/1973 | Schor et al. | 333/182 |
| 3,710,299 | 1/1973 | Weisenburger | 339/17 CF |
| 3,718,750 | 2/1973 | Sayers | 339/17 M |
| 3,854,107 | 12/1974 | Tuchto et al. | 333/183 |
| 3,941,448 | 3/1976 | Evans | 339/176 MF |
| 4,020,430 | 4/1977 | Heyden | 333/183 |
| 4,029,374 | 6/1977 | Nestor et al. | 339/17 LM |
| 4,045,105 | 8/1977 | Lee et al. | 339/17 CF |
| 4,083,022 | 4/1978 | Nijman | 333/183 |
| 4,126,840 | 11/1978 | Selvin | 333/182 |
| 4,144,509 | 3/1979 | Boutros | 333/181 |
| 4,187,481 | 2/1980 | Boutros | 333/182 |
| 4,195,272 | 3/1980 | Boutros | 333/182 |

Primary Examiner—Neil Abrams

[57] ABSTRACT

A filter connector comprises a front insulator shaped to house a monolithic capacitor within a slot bordered by rows of contact cavities. A thin metallic plate, or spring array, is aligned with the front insulator so that a plurality of spring tabs on the spring array project inwardly into the insulator slot and each of a plurality of spring tines on the spring array project inwardly into a correspondingly aligned contact cavity. The capacitor is then inserted into the slot so that external electrodes thereon contact a spring tab aligned therewith. A contact pin is then inserted into a contact cavity, causing the spring tine to deflect and make contact. A rear insulator is then aligned with the spring array to sandwich the spring array between the front and rear insulators. The rear insulator breaks portions of the spring array and thereby isolates each spring of the array.

14 Claims, 9 Drawing Figures

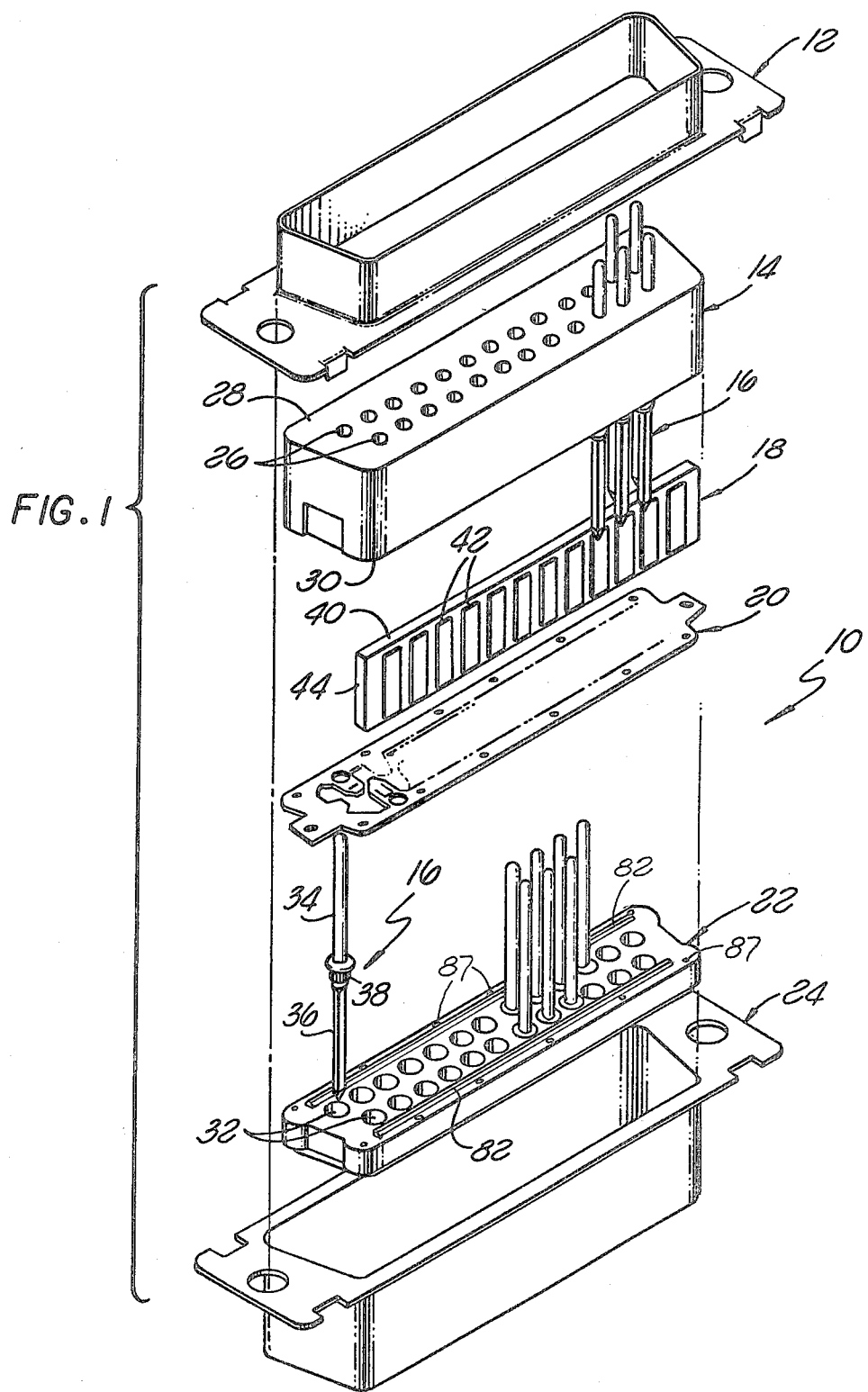

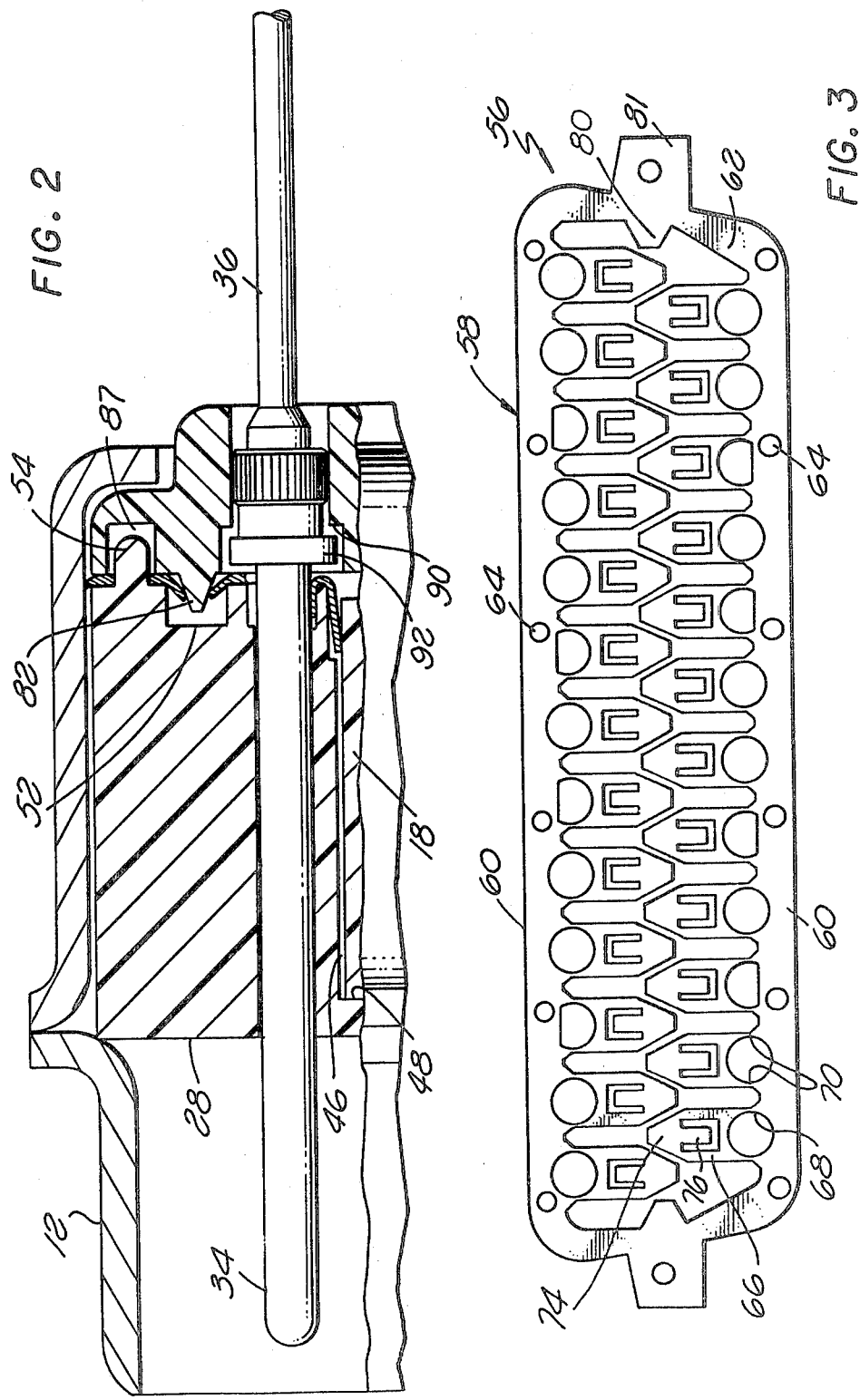

000
FILTER CONNECTOR AND METHOD OF ASSEMBLY THEREOF

BACKGROUND OF THE INVENTION

The present invention relates generally to an electrical connector and, more particularly, to a filter electrical connector and to a method for assembling the same.

As explained in U.S. Pat. No. 4,126,840 to Selvin, assigned to the assignee of the present application, a problem which is frequently encountered by users of electronic equipment is that of electromagnetic interference (EMI). Such interference may be reduced by utilizing filtered connectors with such electronic equipment. The aforementioned Selvin patent discloses a unique filter connector arrangement utilizing a monolithic capacitor which is mounted between two rows of contacts in an electrical connector. The contacts are electrically connected to the parallel, spaced live electrodes on the capacitor by soldering. Thereafter the contacts and capacitor are incapsulated by a potting compound. The use of solder and potting ususally yields a lower reliability assembly that is non-repairable and requires a high degree of process control to produce.

It is therefore the object of the present invention to provide a filter connector utilizing a monolithic capacitor as in the aforementioned Selvin patent, but without the requirement of soldering or potting of the parts, or the use of separate spring elements, preforms, fixturing or installation of separate components for each contact which is required in many prior art filter connectors now in commercial use.

SUMMARY OF THE INVENTION

According to a principal aspect of the present invention, there is provided a filter connector comprising an insulator body having at least one row of cavities therein each receiving an electrical contact. A slot is formed in the insulator body parallel to the row of cavities. A monolithic capacitor is mounted in the slot. A spring element is associated with each of the contact cavities making electrical connection between the contact therein and a corresponding live electrode on the capacitor.

Since spring elements are utilized for making electrical connections between the contacts and the capacitor in the connector, soldering and potting is not required as in the aforementioned Selvin connector. Furthermore, the contacts and capacitor may be replaced if they become damaged. Furthermore, the interconnecting spring provides a reliable electrical connection between the contacts and the electrodes on the capacitor.

According to another aspect of the invention, there is provided a method of assembling a filter connector having front and rear insulators with a slot and a row of contact cavities formed in the front insulator. The method involves the steps of placing a spring array against the rear of the front insulator. The spring array embodies a strip having a plurality of spring elements thereon each having a resilient tab extending into one of the cavities and a resilient tine extending toward the slot in the front insulator. The monolithic capacitor is inserted into the slots so that the live electrodes thereon engage the tines. Contacts are then inserted into the cavities so as to engage the tabs on the spring array. The spring elements are separated from the strip so that each element is electrically isolated from the strip and provides electrical connection between a contact and a corresponding live electrode on the capacitor. The rear insulator is mounted against the rear of the front insulator with the spring elements trapped therebetween.

In a preferred embodiment, the rear insulator is used as a tool to simultaneously separate the spring elements from the strip when the rear insulator is mounted against the rear of the front insulator. Accordingly, the overall assembly utilizes a minimum number of parts and process steps to produce the desired monolithic capacitor filter connector.

BRIEF DESCRIPTION OF THE DRAWINGS

FIG. 1 is an exploded view of the filter connector of the present invention;

FIG. 2 is a partial longitudinal sectional view of the assembled connector;

FIG. 3 is a top plan view of a metallic plate which is utilized to form the spring array of the present invention;

DESCRIPTION OF THE PREFERRED EMBODIMENTS

Figure 4:
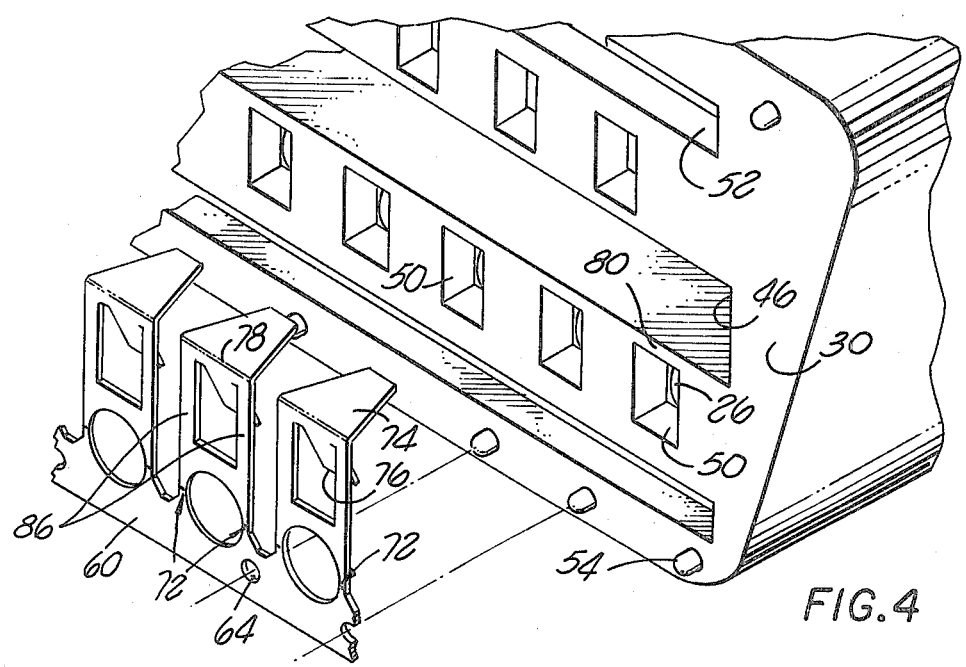
FIG. 4 is a fragmentary perspective view showing a portion of the spring array positioned for mounting against the rear of the front insulator of the connector.

Referring now to FIGS. 1-5 in detail, there is illustrated one embodiment of the filter connector of the present invention, generally designated 10. As best seen in FIG. 1, the filter connector comprises a front shell 12, a front insulator 14, contacts 16, a monolithic capacitor 18, a spring array 20, a rear insulator 22 and a rear shell 24.

The front insulator 14 contains two rows of contact cavities 26 each extending from the front face 28 to the rear surface 30 of the insulator. The rear insulator 22 likewise contains two rows of bores 32 which are aligned with the contact cavities 26 and form rearward extensions thereof when the front and rear insulators are assembled together to form a unitary insulator body.

The contacts 16 are illustrated as being pin contacts. Each contact has a forward mating portion 34 in the form of a cylindrical pin, and a rear termination portion 36 which is shown as being a wire-wrappable tail. It will be appreciated, however, that the termination portion may have other constructions, such as that of a socket contact, a crimp barrel, etc. The pin contact embodies an enlarged mounting portion 38 between the forward and rear portions 34, 36. The mounting portion 38 is mounted within a bore 32 in the rear insulator while the forward contacting portion 34 of the contact extends through a cavity 26 in the front insulator beyond the front face 28 thereof. The front shell 12 provides a protective shroud for the exposed pin contacts. The tails 36 extend rearwardly from the rear insulator in rear shell 24 when the parts are fully assembled.

The monolithic capacitor 18 comprises a rectangular ceramic substrate 40 having longitudinally extending spaced live electrodes 42 on its upper and lower surfaces. Ground electrodes 44 are formed on the side edges of the substrate. The live electrodes 42 are spaced apart a distance corresponding to the spacing of the contacts in the two rows of cavities 26 in the front insulator. A pair of ground planes, not shown, embedded in the substrate are joined to the respective ground electrodes 44. Reference may be made to the aforementioned Selvin patent for a more detailed description of the monolithic capacitor, and possible variations in the construction thereof.

An elongated slot 46 is formed in the front insulator 14. The slot is disposed between the two rows of contact cavities. As best seen in FIG. 2, the inner end 48 of the slot terminates prior to the front face 28 of the front insulator. The slot opens at the rear surface 30 of the insulator. The slot is dimensioned to slidably receive the capacitor 18 therein, and is so located that the live electrodes 42 of the capacitor will be aligned with the contacts 16 mounted in the cavities 26 in the front insulator. As best seen in FIG. 4, the rear of each contact cavity 26 is in the form of a rectangular recess or counter bore 50. Elongated laterally extending grooves 52 are formed in the rear surface 30 of the front insulator on opposite sides of the two rows of contact cavities. A series of alignment pins 54 extend outwardly from the rear surface 30 of the front insulator around its perimeter for a purpose which will be described later herein.

The spring array 20 of the present invention is formed from an intricately shaped thin metallic plate 56 as illustrated in FIG. 3. The plate may be a photo etched beryllium copper sheet which embodies good electrical conductivity characteristics and is highly resilient. The plate could also be a precision stamping. The plate comprises an outer frame 58 consisting of elongated upper and lower strips 60 and side strips 62. Openings 64 are formed in the upper and lower strips 60 lying in a pattern corresponding to the pattern of the alignment pins 54 on the front insulator. Alternating spring segments 66 extend inwardly from the opposite upper and lower strips 60 of frame 58. The spacing of the segments corresponds to the spacing of the contact cavities 28 in the front insulator. The width of each spring segment 66 is slightly less than the width of each recess 50 in the rear surface 30 of the front insulator so that portions of the spring segments may be formed and inserted into such recesses, as will be seen later.

Figure 5:
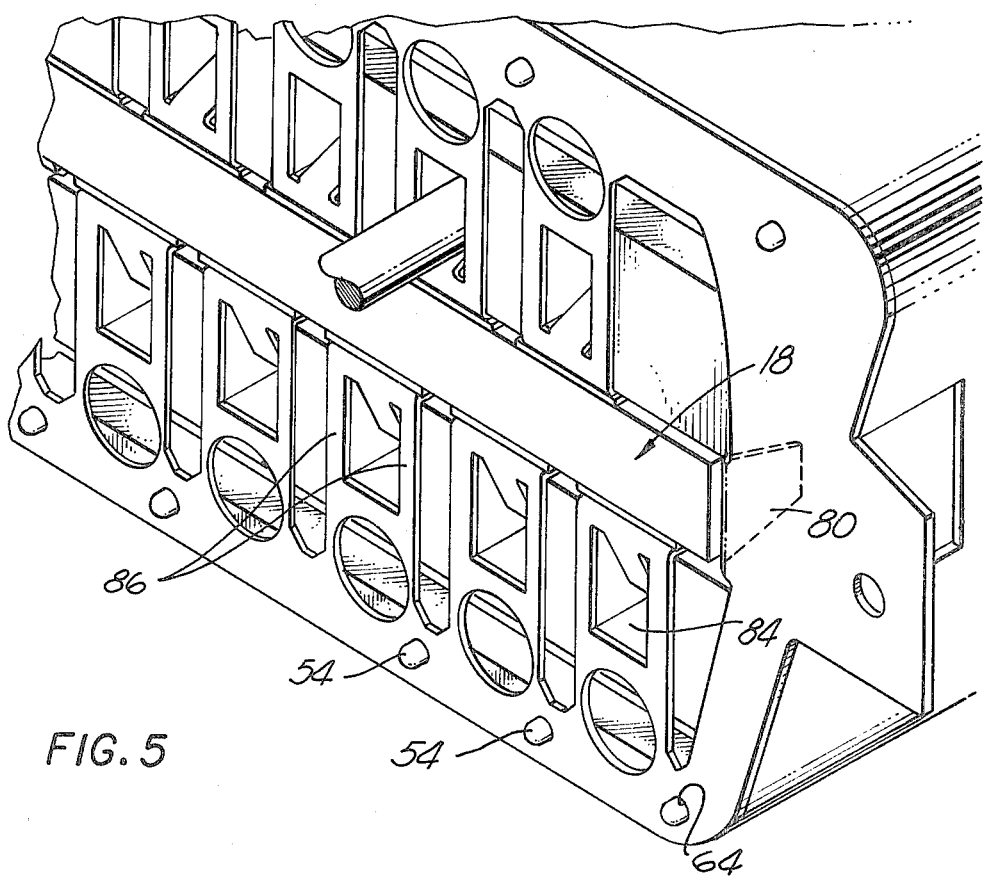
FIG. 5 is a fragmentary perspective view showing the spring array positioned against the rear of the front insulator, and with one contact and a monolithic capacitor mounted in the front insulator.
Figure 6:
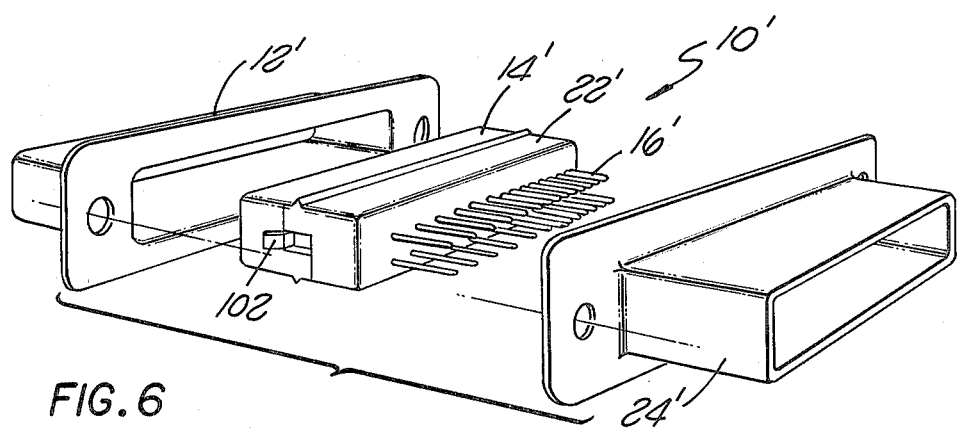
FIG. 6 is an exploded view of a modified form of the filter connector of the present invention.

An opening 68 is cut in each spring segment adjacent to the strip 60 thereby defining narrow connecting links 70 each of which is capable of being easily fractured in the region indicated by the dashed line at 72 in FIG. 4. The inner tapered end of each spring segment 66 forms a resilient tab 74 which is bent forwardly at an angle, as seen in FIG. 4. A resilient time 76 is stamped from each spring segment 66 between the tab 74 and the opening 68, and is bent upwardly and forwardly at an angle as seen in FIG. 4. The tines 76 are dimensioned to slide into the recesses 50 in the rear of the front insulator when the spring array is positioned against the insulator as seen in FIG. 5. In such position, the tabs 74 extend into the monolithic capacitor receiving slot 46. The connecting portion 78 joining each tab 74 to its respective tine 76 fits over the edge 80 joining each recess 50 to the slot 46 when the spring array is mounted against the rear insulator.

Inwardly extending spring fingers 80 are formed on the side strips 62 of frame 58, and are bent forwardly so as to lie in the slot 46 when the spring array is mounted against the rear insulator. Outwardly extending tabs 81 are also formed on the side strips 62 which are connected to the shell 24 in the final assembly.

As seen in FIGS. 1 and 2, laterally extending elongated ribs 82 are formed on the front face of the rear insulator 22 on opposite sides of the two rows of bores 32. The ribs are spaced apart a distance corresponding to the spacing of the grooves 52 in the rear face of the front insulator, and are slidably insertable into such grooves.

To assemble the connector 10, initially the spring array 20 is positioned behind the rear insulator as seen in FIG. 4 with the openings 64 aligned with the pins 54 so that the tines 76 will be aligned with the recesses 50 of the contact cavities 26. The spring array is then positioned over the alignment pins 54 so that tines 76 will enter into the recesses 50 and the tabs 74 will extend into the slot 46 in the front insulator. The monolithic capacitor 18 is then pushed into the slot 46 causing each live electrode 42 thereon to be lightly contacted by its respective resilient tab 74 on the spring array. The capacitor is shown fully inserted in the front insulator in FIGS. 2 and 5. As seen in FIG. 5, with the capacitor mounted in the front insulator, the spring fingers 80 on the side strips of the frame 58 engage the ground electrodes 44 on the side edges of the capacitor.

Thereafter, the mating forward end of each contact 16 is inserted into its respective cavity 26 through the window 84 formed by each punched out tine 76 of the spring array. The tines 76 are deflected when the contacts are so mounted, thereby providing good electrical connection therebetween. Also, the insertion of the contacts into their respective cavities through the spring array causes a rocking action to occur which increases the force between the tabs 74 and the live electrodes on the capacitor. At this point, all contacts 16 are connected to their respective capacitor electrodes.

Since all spring segments 66 are on a common frame 58 of the spring array, they are "shorted" together. Isolation of each spring element 86 consisting of a tab 74 and a tine 76 is accomplished by fracturing the connecting links 70 at the break points 72. This is preferably done by mounting the rear insulator 22 over the tails 36 of the contacts 16, and pushing the rear insulator forwardly so that the ribs 82 on the front face thereof press against the break points 72, thereby fracturing the same as the ribs slide into the grooves 52 as seen in FIG. 2. Since each spring element 86 is then isolated from the surrounding frame 58, it provides electrical connection only between its corresponding contact and a respective live electrode 42 on the capacitor 18. The spring fingers 80 and tabs 82 on the frame 58 of the spring array provide a ground connection between electrodes 44 on the capacitor and the shell 24.

When the rear insulator is mounted flush against the spring array 20, the spring array, and consequently the spring elements 86, will be trapped between the front and rear insulators, thereby firmly holding them in place when the front and rear shells 12 and 24, respectively, are secured together over the insulators.

As seen in FIGS. 1 and 2, recesses 87 formed in the front face of the rear insulator receive the alignment pins 54 on the front insulator when the front and rear insulators are mounted together. Furthermore, the rear insulator cooperates with the front insulator to retain the contacts therein. This will be best appreciated by referring to FIG. 2 wherein it is seen that an annular shoulder 90 is formed in the interior of each bore 32 in the rear insulator which is positioned behind an outwardly extending flange 92 on the contact, thereby preventing rearward movement of the contact in the contact cavity of the insulator assembly.

From the foregoing, it will be appreciated that the single spring array 20, when fully mounted in the connector in the manner just described, provides electrical connection between such individual contact and its respective live electrode on the capacitor and grounding connection between the ground electrodes of the capacitor and the shell of the connector. The assembly process is simple to perform, requires no special tooling and utilizes only a minimum number of parts since individual spring elements are not required to be separately mounted in the contact cavities to make electrical connection between the capacitor and the contacts therein. Furthermore, the connector may be readily disassembled in order to replace any contacts or the capacitor if they become damaged during use.

A modified embodiment of the invention is illustrated in FIGS. 6-9 wherein parts identical to or corresponding to those employed in the embodiment illustrated in FIGS. 1-5 are designated by the same reference numerals primed. Thus, the connector 10' in FIGS. 6-9 comprises a front shell 12', a front insulator 14', a rear insulator 22', and a rear shell 24'. Double-ended pin contact 16' extend through longitudinally extending cavities 26' and 32' in the front and rear insulators, respectively.

Figure 7:
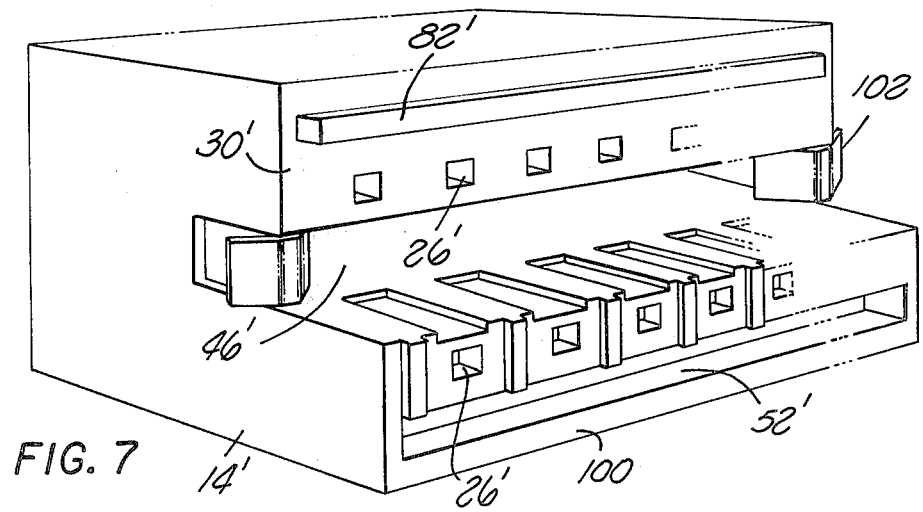
FIG. 7 is a perspective view of one-half of the insulator assembly of the connector illustrated in FIG. 6.
Figure 9:
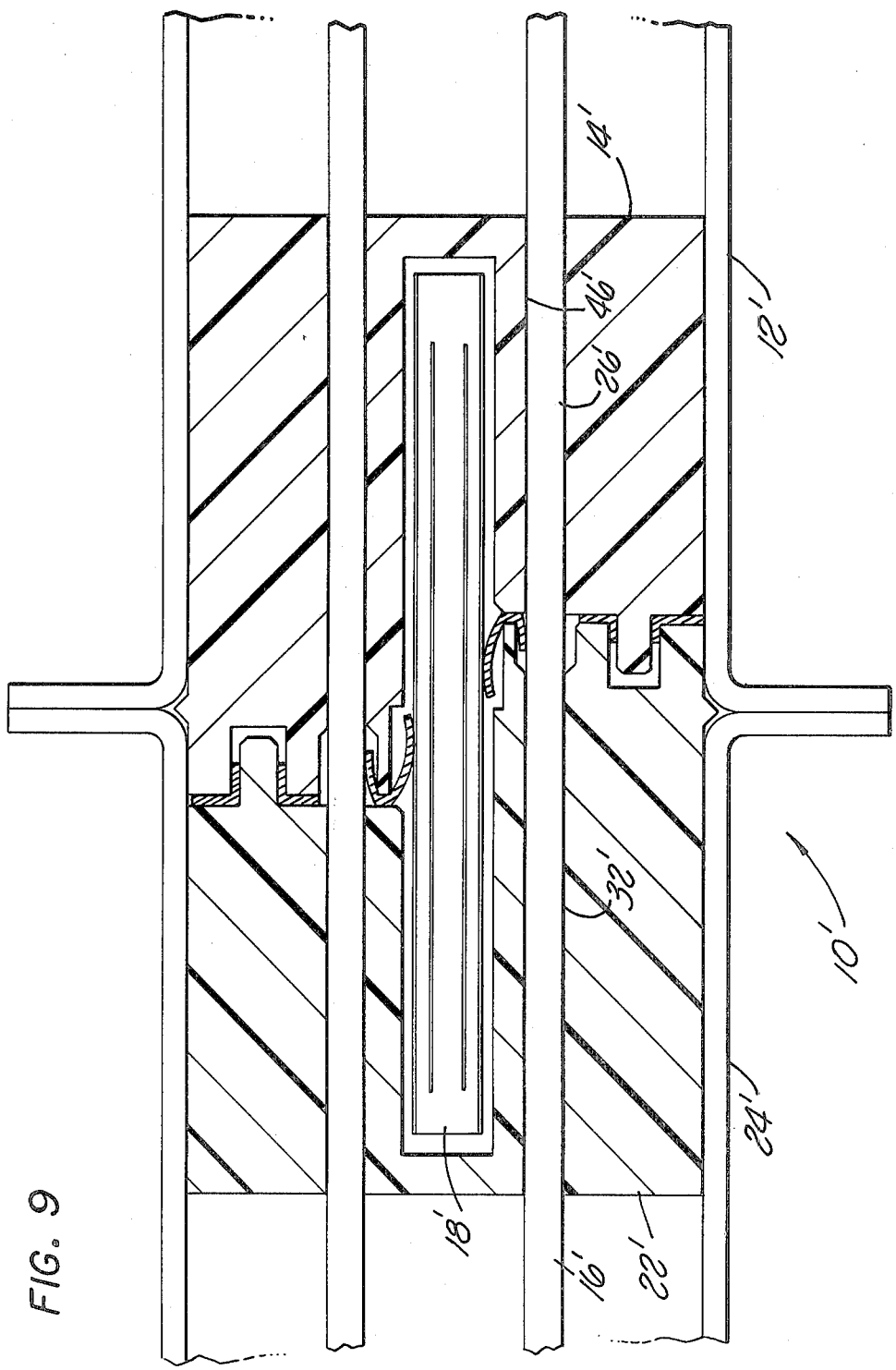
FIG. 9 is a partial longitudinal sectional view of the fully assembled connector shown in FIG. 6.

The front and rear insulators of the connector 10' are identical, only one being shown in FIG. 7. The front insulator 14' illustrated in FIG. 7 has a rearward extension 100 providing a stepped face which matches with the corresponding stepped face on the rear insulator 22'. The slot 46' in the insulator assembly extends into both the insulators, as seen in FIG. 9.

Figure 8:
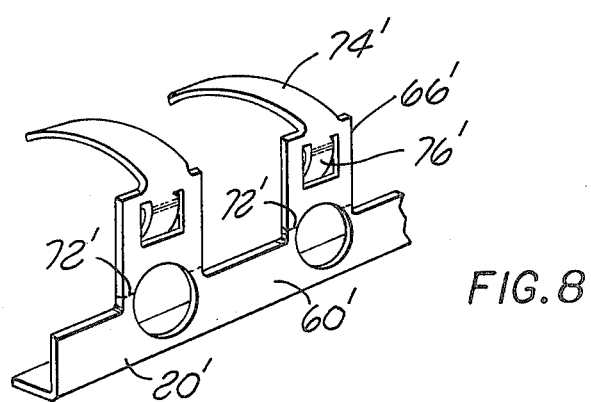
FIG. 8 is a fragmentary perspective view of the spring array utilized in the connector illustrated in FIG. 6.

Two spring arrays 20' are employed in the connector 10'. As seen in FIG. 8, each spring array comprises an elongated carrier strip 60' embodying a plurality of spring segments 66' each formed with a resilient tab 74' and a resilient tine 76'. When the array 20' is positioned against the rear of extension 100 on the front insulator 14', for example, the tines 76' will extend into the contact cavities 26' in the front insulator and the tabs 74' will extend over the extension 100 in the direction of the slot 46' in the front insulator. An elongated fracturing rib 82' is formed on the rear face 30' of the front insulator above the upper row of contact cavities 26' therein. A matching groove 52' is formed on the rear face of the extension 100 on the opposite side of the lower row of contact cavities.

To assemble the connector 10', two spring arrays 20' are positioned against the extensions 100 of the front and rear insulators and the insulators are pressed together, as in the first embodiment of the invention, whereupon the ribs 82' on the rear faces of the insulators will fracture the spring segments 66' along break points 72' thereby separating the spring tab and tine assembly of each segment from its respective carrier strip 60', whereby the resulting spring elements are electrically isolated from each other. The monolithic capacitor 18' and contacts 16' are mounted in the slot 46' and contact cavities 26' before the insulators are assembled together. It will be appreciated that the resulting assembly functions in the same manner as the connector 10 of the first embodiment of the invention except for the fact that separate ground connecting springs 102 are required for making electrical connection between the ground electrodes on the monolithic capacitor and the shell 12'. Because each spring array 20' in this embodiment of the invention is in the form of a single strip, rather than a frame, the strip may be made on a progressive stamp die and cut to length according to the number of contacts in the insulator.

While the invention herein has been described as employing one of the insulator halves of the connector assembly to fracture the spring array to separate the spring elements from their connecting carrier strips, it will be appreciated that, if desired, the separating operation may be performed separately utilizing a suitable tool or fixture, but at the expense of adding an additional process step to the assembly operation.

What is claimed is:
1. A filter connector comprising:
an insulator body having at least one row of cavities therein, each said cavity receiving an electrical contact;
a slot in said body parallel to said row of cavities;
a monolithic capacitor in said slot;
said capacitor comprising a dielectric substrate having a plurality of parallel, spaced live electrodes on an outer face thereof facing in the direction of said contacts and aligned therewith;
an individual, separate conductive spring element associated with each of said contact cavities making resilient electrical connection between the contact therein and a corresponding live electrode of said capacitor; and
a conductive carrier strip for said spring elements mounted on said insulator body and separated from said spring elements.
2. A filter connector as set forth in claim 1 wherein: said capacitor is slidably mounted in said slot.
3. A filter connector as set forth in claim 1 wherein: said insulator body comprises a front insulator and a rear insulator;
said cavities extend through said front and rear insulators;
said slot is located in said front insulator; and
said rear insulator retains said capacitor in said front insulator.
4. A filter connector as set forth in claim 3 wherein: each said spring element is retained in said body by being trapped between said front and rear insulators.
5. A filter connector as set forth in claim 3 wherein: each said cavity and said slot are joined by a rearwardly facing edge on said front insulator;
each said spring element extending over one of said edges and embodying a resilient tab engaging the contact in said cavity and a resilient tine extending into said slot to engage said corresponding live electrode.
6. A filter connector as set forth in claim 5 wherein: said strip for said spring elements is trapped between said front and rear insulators, said strip embodying joints broken away from said spring elements.
7. A filter connector as set forth in claim 6 wherein: said front insulator embodies a groove in its rear surface located between said strip and said row of contact cavities; and said rear insulator embodies an elongated rib projecting into said groove separating said strip from said spring elements.

8. A filter connector as set forth in claim 6 wherein:
a conductive shell surrounds said insulator body;
said capacitor embodies a ground electrode on a longitudinally extending edge thereof; and
said carrier strip embodies a spring finger extending into said slot to engage said ground electrode and an outwardly extending tab engaging said shell.

9. A filter connector comprising:
an insulator body having at least one row of cavities therein, each said cavity receiving an electrical contact;
a slot in said body parallel to said row of cavities;
a monolithic capacitor in said slot;
said capacitor comprising a dielectric substrate having a plurality of parallel, spaced live electrodes on an outer face thereof facing in the direction of said contacts and aligned therewith;
spring means associated with each of said contact cavities making electrical connection between the contact therein and a corresponding live electrode of said capacitor;
said insulator body comprising identical front and rear insulators;
said cavities extending through said front and rear insulators;
said slot being formed by matching recesses in said front and rear insulators; and
said capacitor being retained in said insulator body by being trapped between said front and rear insulators thereof.

10. A filter connector comprising:
an insulator body having two rows of cavities therethrough, each said cavity receiving an electrical contact;
said body comprising front and rear insulators;
a slot in said front insulator between and parallel to said rows of cavities and opening to the rear of said front insulator;
a monolithic capacitor in said slot;
said capacitor comprising a dielectric substrate having a plurality of parallel, spaced live electrodes on the upper and lower faces thereof facing said contacts in said two rows and aligned therewith;
said rear insulator retaining said capacitor in said slot;
an individual spring element associated with each said cavity, each said spring element being trapped between said front and rear insulators;
each said spring element embodying a resilient tab engaging the contact in its corresponding cavity and a resilient tine extending into said slot to engage a corresponding live electrode of said capacitor;
a metallic frame being trapped between said front and rear insulators and surrounding said two rows of cavities and said slot, said frame including upper and lower carrier strips for said spring elements; and
fractured connecting links between said strips and said spring elements.

11. A filter connector as set forth in claim 10 wherein:
said front insulator embodies two grooves in its rear surface each located between said frame and a corresponding row of cavities; and
said rear insulator embodies elongated ribs projecting into said grooves separating said strips from said spring elements by fracturing said links.

12. A filter connector as set forth in claim 11 wherein:
a metallic shell surrounds said insulator body;
said capacitor embodies a ground electrode on a longitudinally extending edge thereof; and
said frame embodies a spring finger extending into said slot to engage said ground electrode and an outwardly extending tab engaging said shell.

13. A method of assembling a filter connector having front and rear insulators with a slot and a row of contact cavities in said front insulator, comprising the steps of:
placing a spring array against the rear of said front insulator, said array embodying a strip having a plurality of spring elements thereon each having a resilient tab extending into one of said cavities and a resilient tine extending toward said slot;
inserting a monolithic capacitor into said slot so that live electrodes thereon engage said tines;
inserting contacts into said cavities so as to engage said tabs;
separating said spring elements from said strip whereby each said element is electrically isolated from said strip and provides electrical connection between a contact and a corresponding live electrode on said capacitor; and
mounting said rear insulator against the rear of said front insulator with said spring elements trapped therebetween.

14. A method as set forth in claim 13 wherein:
said rear insulator is used as a tool to simultaneously separate said spring elements from said strip when said rear insulator is mounted against the rear of said front insulator.

* * * * *